(12) United States Patent
Vardhan et al.

(10) Patent No.: US 8,972,423 B2
(45) Date of Patent: Mar. 3, 2015

(54) OPAQUE MECHANISM FOR WEB SERVICE INTEROPERABILITY

(75) Inventors: Puneet Vardhan, New Brighton, MN (US); Ronald Marchi, Laguna Hills, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 2109 days.

(21) Appl. No.: 11/535,420

(22) Filed: Sep. 26, 2006

(65) Prior Publication Data

US 2008/0077610 A1    Mar. 27, 2008

(51) Int. Cl.
G06F 7/00 (2006.01)
G06F 17/30 (2006.01)

(52) U.S. Cl.
CPC .... *G06F 17/30861* (2013.01); *G06F 17/30569* (2013.01)
USPC .......................................... 707/755; 707/811

(58) Field of Classification Search
CPC ..................... G06F 17/30923; G06F 17/30914
USPC .............. 707/100, 104.1, 203, 604, 809–811, 707/755, 760
See application file for complete search history.

(56) References Cited

U.S. PATENT DOCUMENTS

| | | | | |
|---|---|---|---|---|
| 6,272,554 B1 * | 8/2001 | Chang et al. | ................... | 719/313 |
| 7,426,721 B1 * | 9/2008 | Saulpaugh et al. | ............ | 717/144 |
| 7,739,290 B2 * | 6/2010 | Rossmann | ..................... | 707/755 |
| 2003/0163603 A1 * | 8/2003 | Fry et al. | ........................ | 709/328 |
| 2004/0225724 A1 | 11/2004 | Pavlik et al. | | |
| 2004/0267760 A1 * | 12/2004 | Brundage et al. | .............. | 707/100 |
| 2005/0044197 A1 * | 2/2005 | Lai | ................................ | 709/223 |
| 2005/0086594 A1 | 4/2005 | Schlimmer et al. | | |
| 2005/0091671 A1 * | 4/2005 | Deem et al. | ..................... | 719/328 |
| 2005/0198333 A1 * | 9/2005 | Dinges et al. | .................. | 709/229 |
| 2005/0246716 A1 * | 11/2005 | Smith et al. | .................... | 719/315 |
| 2005/0273772 A1 * | 12/2005 | Matsakis et al. | ............... | 717/136 |
| 2006/0026168 A1 * | 2/2006 | Bosworth et al. | ................ | 707/10 |
| 2006/0031256 A1 * | 2/2006 | Bosworth et al. | ........... | 707/104.1 |
| 2006/0031264 A1 * | 2/2006 | Bosworth et al. | .............. | 707/200 |
| 2006/0103655 A1 * | 5/2006 | Nelson et al. | .................. | 345/473 |
| 2006/0117073 A1 * | 6/2006 | Bosworth et al. | .............. | 707/201 |
| 2006/0167856 A1 * | 7/2006 | Angele et al. | ...................... | 707/3 |
| 2007/0005786 A1 * | 1/2007 | Kumar et al. | .................. | 709/230 |
| 2007/0038610 A1 * | 2/2007 | Omoigui | ........................... | 707/3 |
| 2007/0073753 A1 * | 3/2007 | Baikov | ........................... | 707/101 |
| 2007/0074228 A1 * | 3/2007 | Suzumura et al. | ............ | 719/330 |

FOREIGN PATENT DOCUMENTS

EP     1 469 386 A     10/2004

OTHER PUBLICATIONS

Powel, Matt: "Web Services, Opaque Data, and the Attachments Problem" MSDN, Web Services Technical Articles, [Online] Jun. 2004, pp. 1-8, XP002416423.

* cited by examiner

*Primary Examiner* — Mariela Reyes
*Assistant Examiner* — Linh Black

(57) ABSTRACT

A system, method, and computer program for parsing a schema across a system to support interoperable machine-to-machine interaction over a network, comprising the steps of communicating a plurality of data in a data defining mark-up language file by a transport protocol stack; parsing said data defining mark-up language to determine at least one opaque schema element; and translating said at least one opaque schema element to a mark-up language string element and appropriate means and computer-readable instructions.

17 Claims, 6 Drawing Sheets

OPAQUE MECHANISM FOR WEB SERVICE INTEROPERABILITY

TECHNICAL FIELD

The presently preferred embodiment of the innovations described herein relate generally to interoperability of machine-to-machine interaction over a network. More specifically, the presently preferred embodiment relates to an opaque mechanism for web service interoperability.

BACKGROUND

Most people commonly refer to the Internet as the World Wide Web, or Web for short. The Web uses multimedia (graphics, text, sound, video, etc.) to connect people to information on global scale. The Web has evolved from simply connecting people to people, or people to servers, to connecting servers to servers. Servers connect via web services that provide a standard means of interoperating between different software applications running on a variety of platforms and/or frameworks. The phrase "web service" is defined by the W3C (World Wide Web Consortium, www.w3c.org) as a software system designed to support interoperable machine-to-machine interaction over a network. Those web services are characterized by their great interoperability and extensibility, as well as their machine-processable descriptions thanks to the use of XML. They can be combined in a loosely coupled way in order to achieve complex operations. Programs providing simple web services (or simply referred to as "services") can interact with each other in order to deliver sophisticated added-value benefits.

Other systems interact with the web service in a manner prescribed by using a protocol for exchanging XML-based messages, for example the SOAP protocol, over a computer network. SOAP messages are typically conveyed using HTTP with an XML serialization in conjunction with other Web-related standards. Using standard W3C XML schemas, UGS Corp. created PLM XML to be an emerging format for facilitating product lifecycle interoperability using XML. Unfortunately, however, the PLM XML schema is not entirely supported by any of the major SOAP stack vendors.

What is needed is a custom serializer/de-serializer so that a PLM XML document can be marshaled/un-marshaled into Java Objects for processing regardless of SOAP stack vendor.

SUMMARY

To achieve the foregoing, and in accordance with the purpose of the presently preferred embodiment as broadly described herein, the present application provides a method of parsing a schema across a system to support interoperable machine-to-machine interaction over a network, comprising the steps of communicating a plurality of data in a data defining mark-up language file by a transport protocol stack; parsing said data defining mark-up language to determine at least one opaque schema element; and translating said at least one opaque schema element to a mark-up language string element. The method, wherein said data defining mark-up language is XML. The method, wherein said parsing step is included in a Web Services Definition Language (WSDL) format. The method, wherein said translating step uses a XML namespace. The method, wherein said XML namespace is an interoperability format. The method, wherein said communicating step occurs over a network capable of interoperable machine-to-machine interaction. The method, wherein said transport protocol stack is a protocol for exchanging XML-based messages over a computer network. The method, wherein said transport protocol stack is SOAP. The method, wherein said parsing step uses a deep copy mechanism. The method, further comprises the steps of calling a deep copy helper to extract a plurality of opaque data corresponding to input type; filling a plurality of objects with said opaque data in a recursive manner; and returning said objects to convert to an opaque string.

Another advantage of the presently preferred embodiment is to provide a computer-program product tangibly embodied in a machine readable medium to perform a method of parsing a schema across a plurality of disparate vendors having interoperability of at least one web service, comprising instructions for communicating a plurality of data in a data defining mark-up language file by a transport protocol stack; instructions for parsing said data defining mark-up language to determine at least one opaque schema element; and instructions for translating said at least one opaque schema element to a mark-up language string element. The computer-program product, wherein said data defining mark-up language is XML. The computer-program product, wherein said instructions for parsing is included in a Web Services Definition Language (WSDL) format. The computer-program product, wherein said instructions for translating uses a XML namespace. The computer-program product, wherein said XML namespace is an interoperability format. The computer-program product, wherein said instructions for communicating occurs over a network capable of interoperable machine-to-machine interaction. The computer-program product, wherein said transport protocol stack is a protocol for exchanging XML-based messages over a computer network. The computer-program product, wherein said transport protocol stack is SOAP. The computer-program product, wherein said instructions for parsing uses a deep copy mechanism. The computer-program product, further comprises instructions for calling a deep copy helper to extract a plurality of opaque data corresponding to input type; instructions for filling a plurality of objects with said opaque data in a recursive manner; and instructions for returning said objects to convert to an opaque string.

And another advantage of the presently preferred embodiment is to provide a data processing system having at least a processor and accessible memory to implement a method for parsing a schema across a system to support interoperable machine-to-machine interaction over a network, comprising means for communicating a plurality of data in a data defining mark-up language file by a transport protocol stack; means for parsing said data defining mark-up language to determine at least one opaque schema element; and means for translating said at least one opaque schema element to a mark-up language string element.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 1:
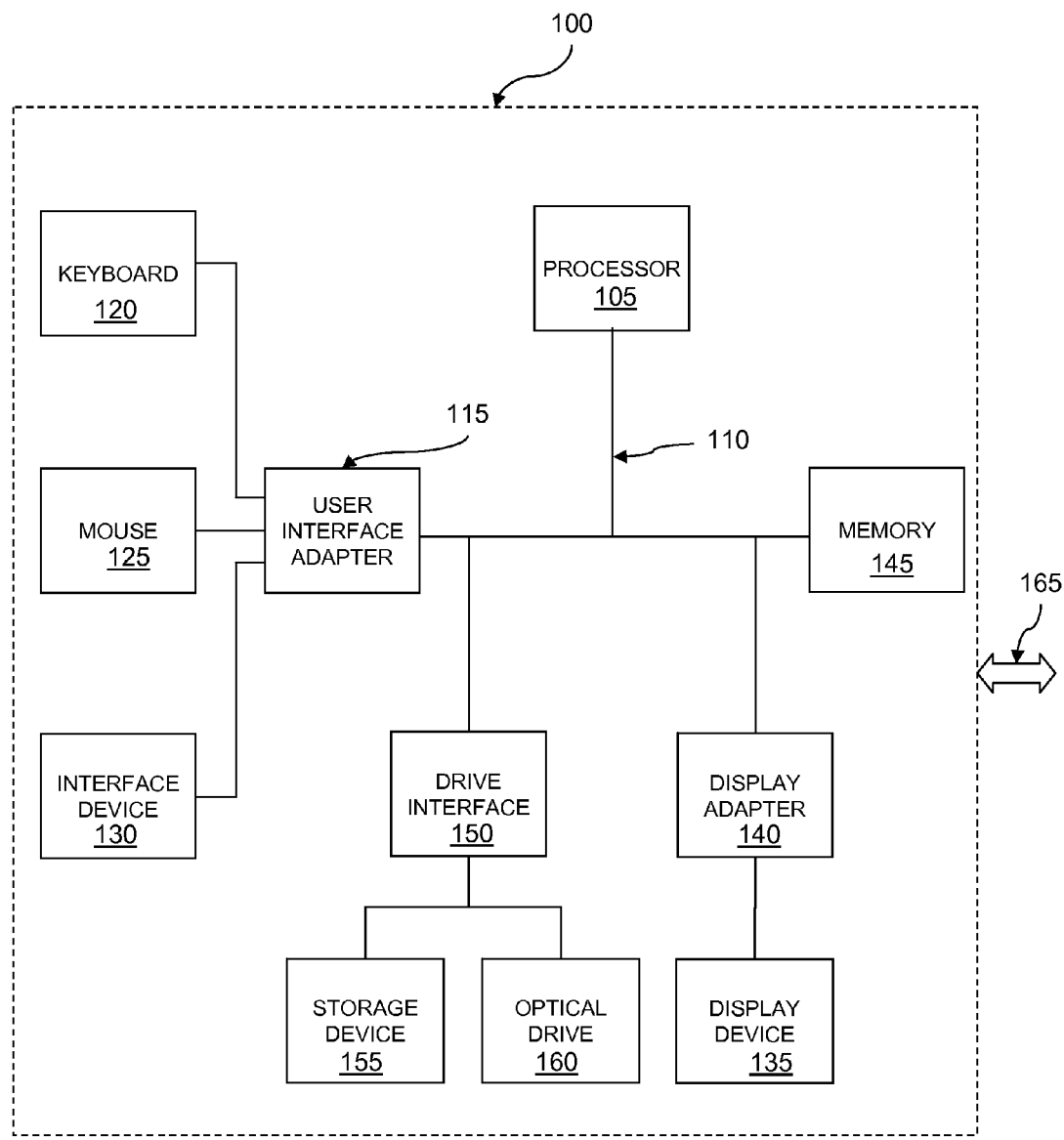
FIG. 1 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method of opaque mechanism for web service interoperability. Now therefore, in accordance with the presently preferred embodiment, an operating system executes on a computer, such as a general-purpose personal computer. FIG. 1 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

With reference to FIG. 1, an exemplary system for implementing the presently preferred embodiment includes a general-purpose computing device in the form of a computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The bus 110 may be any of several types of bus structures including a memory bus or memory controller, a peripheral bus, and a local bus using any of a variety of bus architectures. The computer 100 typically includes a user interface adapter 115, which connects the microprocessor 105 via the bus 110 to one or more interface devices, such as a keyboard 120, mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to a memory 145, which can include ROM, RAM, etc.

The computer 100 further includes a drive interface 150 that couples at least one storage device 155 and/or at least one optical drive 160 to the bus. The storage device 155 can include a hard disk drive, not shown, for reading and writing to a disk, a magnetic disk drive, not shown, for reading from or writing to a removable magnetic disk drive. Likewise the optical drive 160 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 100.

The computer 100 can communicate via a communications channel 165 with other computers or networks of computers. The computer 100 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 2:
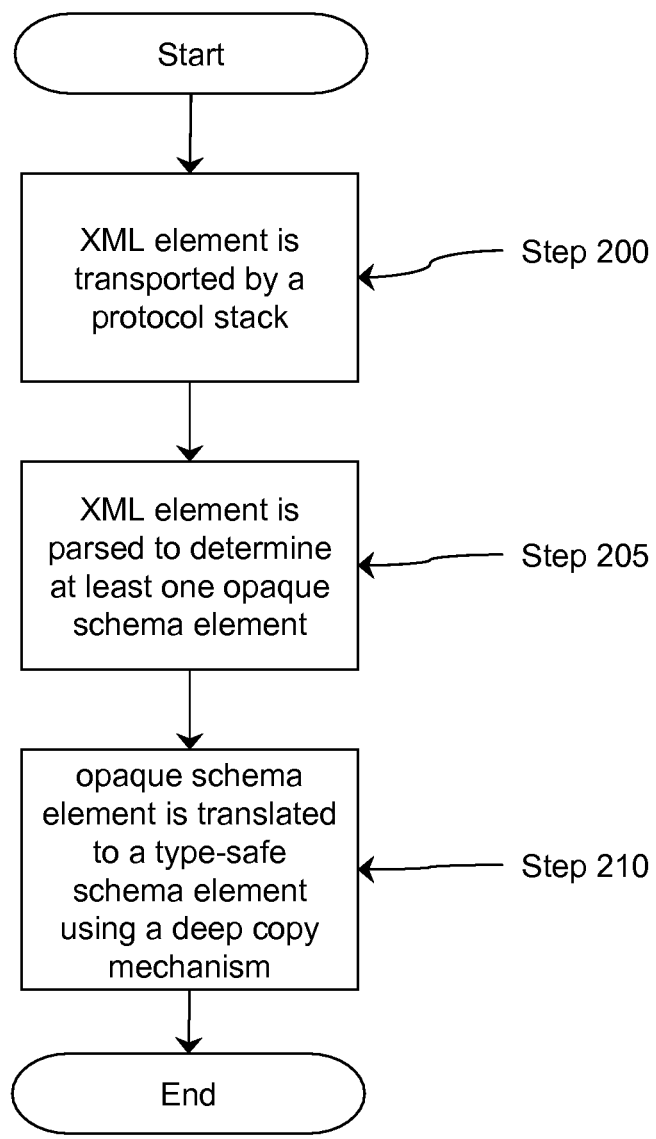
FIG. 2 is a flowchart of the major components for a system and method of an opaque mechanism for web service interoperability.

FIG. 2 is a flowchart of the major components for a system and method of an opaque mechanism for web service interoperability. As shown in FIG. 2, an XML element is transported by a protocol stack (Step 200). Then the XML element is parsed to determine at least one opaque schema element (Step 210). Finally the opaque schema element is translated to a type-safe schema element using a deep copy mechanism (Step 215).

Figure 3:
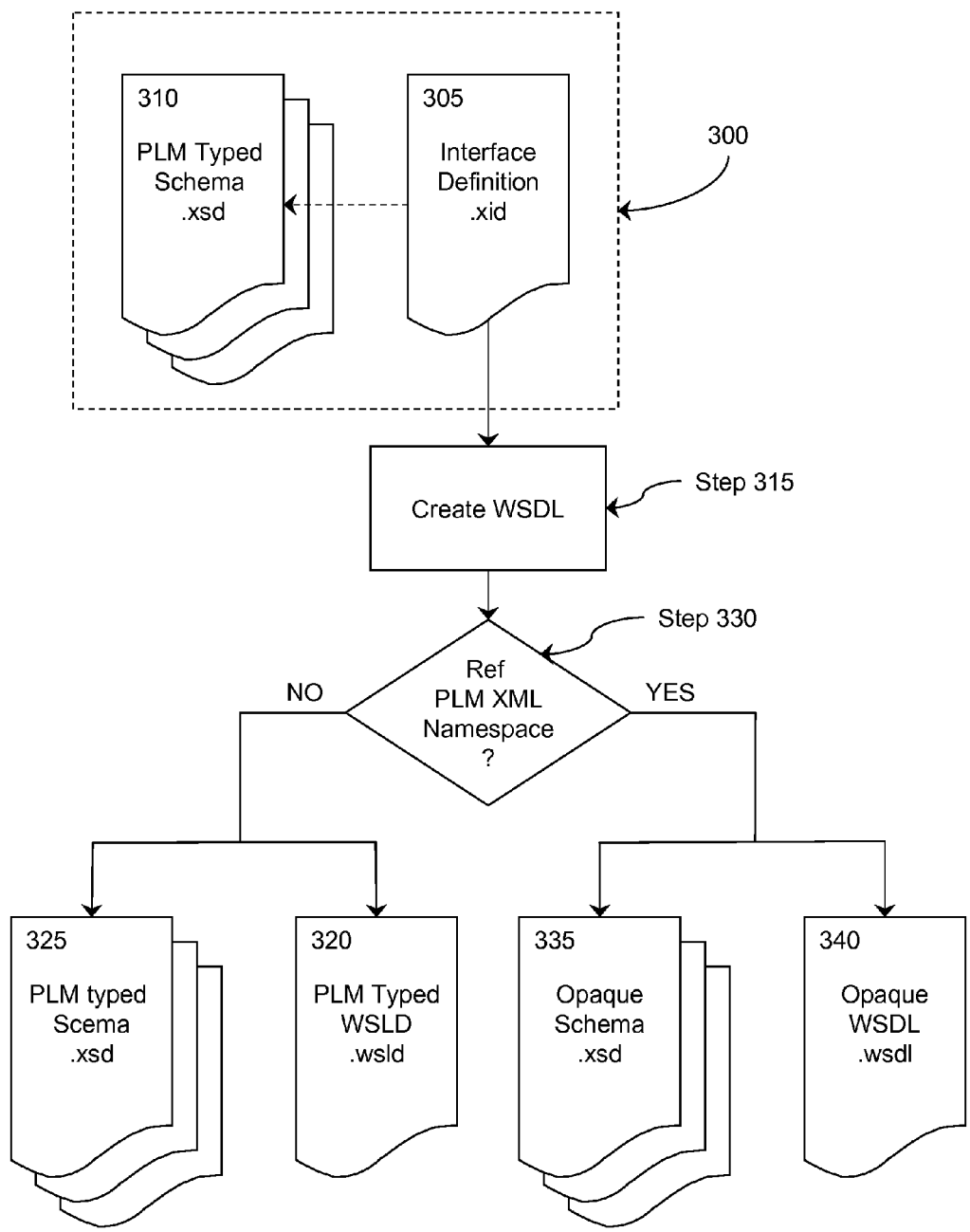
FIG. 3 is a flowchart illustrating the creation of opaque elements in the presently preferred embodiment.

FIG. 3 is a flowchart illustrating the creation of opaque elements in the presently preferred embodiment. A software build tool 300, such as Ant by Apache, for automating software build processes taking as input an XML Interface Definition file 305 that references all needed XML Schema 310 to generate a PLM XML Typed WSDL (Step 315). The files generated by the software build tool 300, a PLM Typed WSDL 320 and a PLM Typed Schema 325, are the source documents for the Web Service artifacts, discussed in more detail below. If, however, the input XML Schema files reference any elements from the PLM XML Namespace, such as the PLM XML schema of UGS Corp., which may be found at www.plmxml.org (Step 330), then an opaque version of the XML Schema, an Opaque Schema (.xsd) 335, is automatically created that hides the PLM XML elements in a string. A corresponding Opaque WSDL (.wsdl) 340 is also be generated for the web service.

Figure 4:
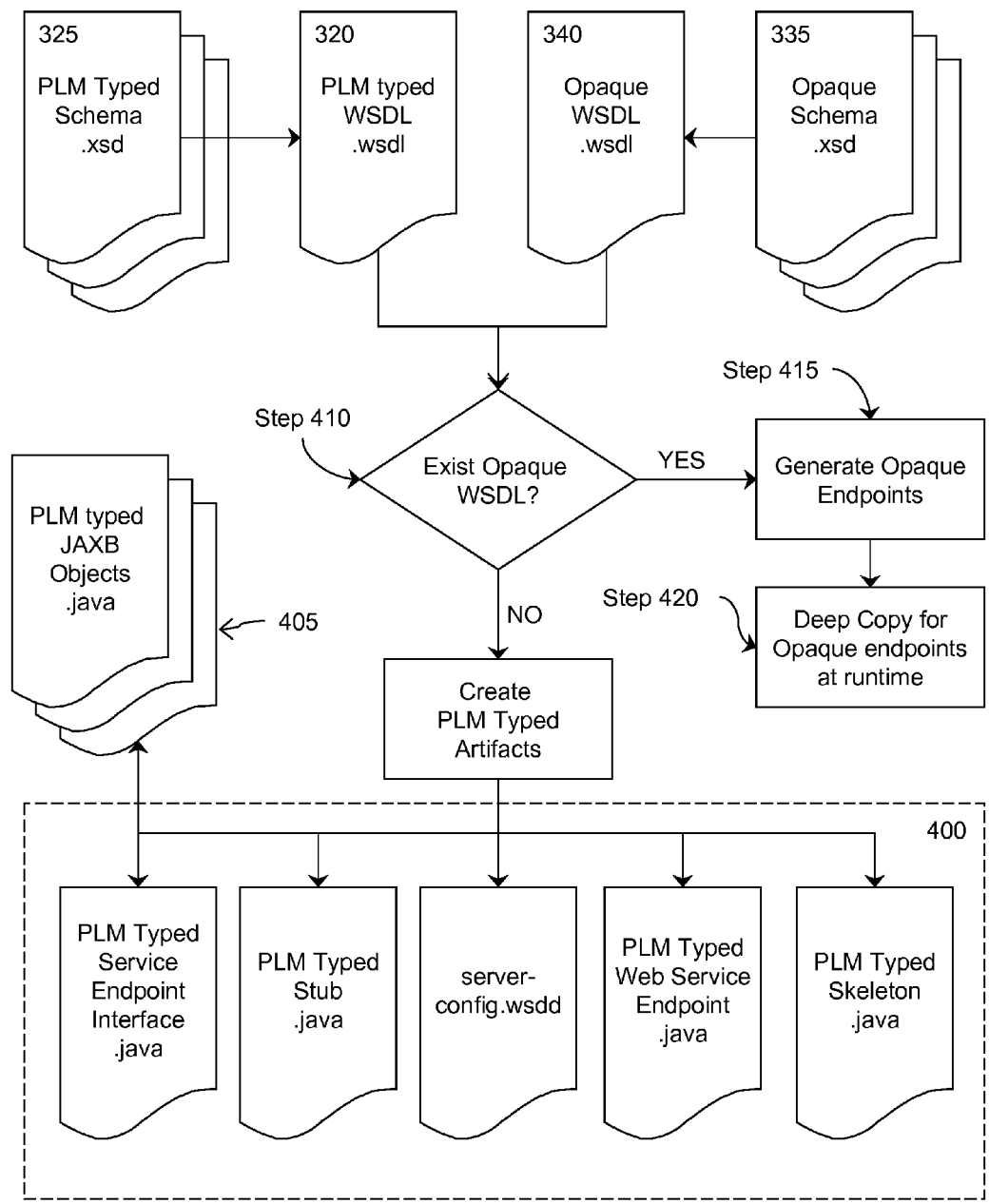
FIG. 4 is a flowchart for the creation of type bindings for data types.

FIG. 4 is a flowchart for the creation of type bindings for data types. As shown in FIG. 4, the software build tool takes as input the WSDL files and associated XML Schemas to generate various type-bindings for the data types defined in the type-safe XML Schema, generally illustrated at 400, in addition to PLM Typed JAXB objects 405, where JAXB is convenient way to bind an XML Schema to a representation in lava code. If, however, the source WSDL is the Opaque WSDL 340 (Step 410), then the Opaque endpoints are generated (Step 415) and the deep copy mechanism discussed in FIG. 5, below, is used to parse and copy the Opaque Schema 335 elements to java objects (Step 420). The opaque endpoint contains the code necessary to invoke the appropriate deep copy helper for transfer of opaque data to java objects.

Figure 5:
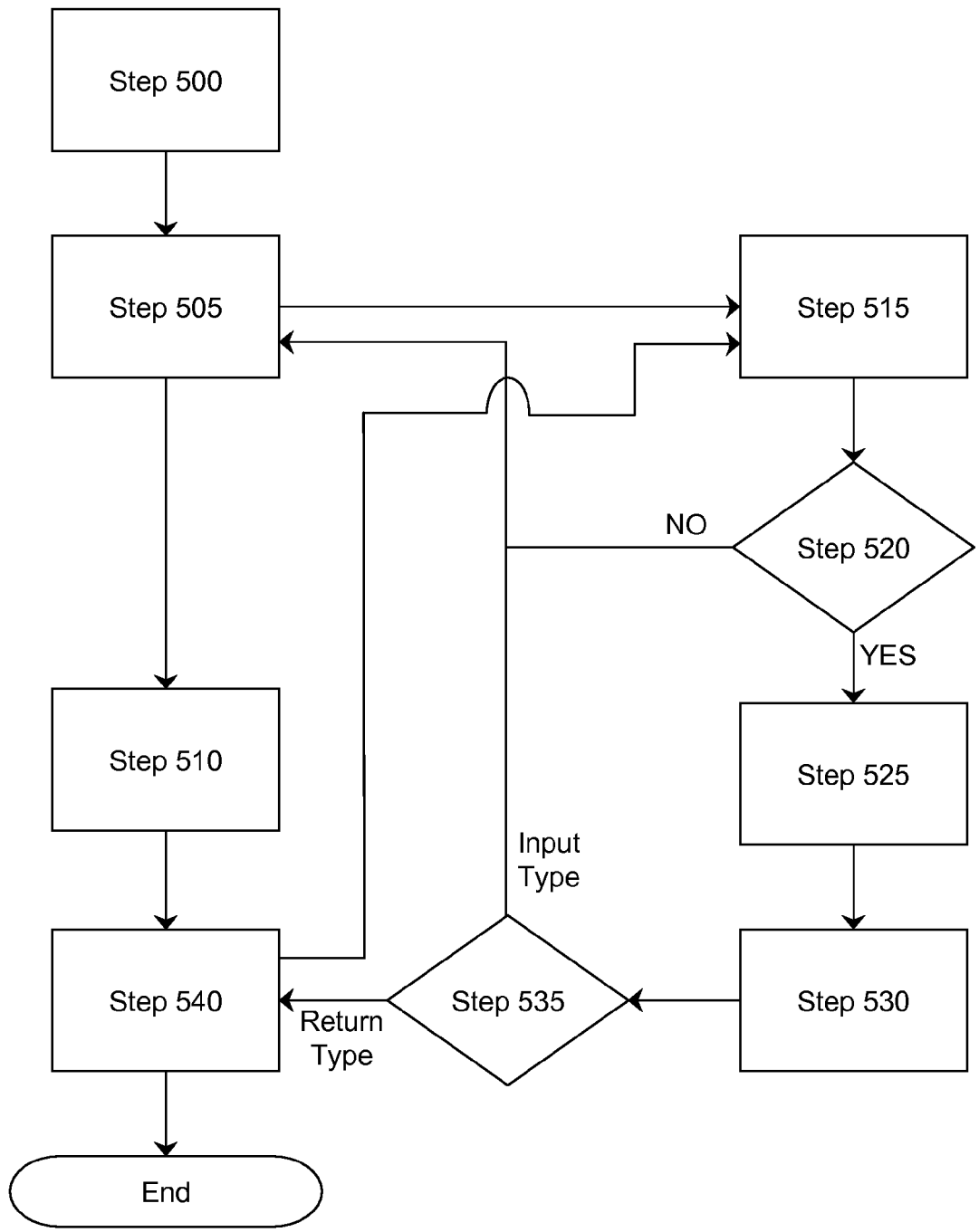
FIG. 5 is a flowchart illustrating deep copy for opaque data during runtime.

FIG. 5 is a flowchart illustrating deep copy for opaque data during runtime. As shown in FIG. 5, the opaque endpoint is invoked via the web service call (Step 500). The opaque endpoint calls a deep copy helper corresponding to an input type to extract the opaque data (Step 505). Next, the endpoint is invoked with the input object containing all of the PLM XML data (Step 510). Meanwhile, the deep copy helper procedure fills JAXB objects with opaque data corresponding to each schema data type (Step 515). If the schema data type DOES NOT refer to child schema elements (Step 520), then return to Step 505. But if schema data type DOES refer to child schema elements (Step 520), then deep copy is invoked for each child element (Step 525). Deep copy is recursively repeated until all child elements are covered (Step 530). The data type returned can be of two forms, an input type or a return type. If the data type is an input type (Step 535), then return to Step 505. Otherwise if the data type returned is a return type, then call deep copy helper corresponding to the return type to convert PLM XML data to an opaque string (Step 540).

Figure 6:
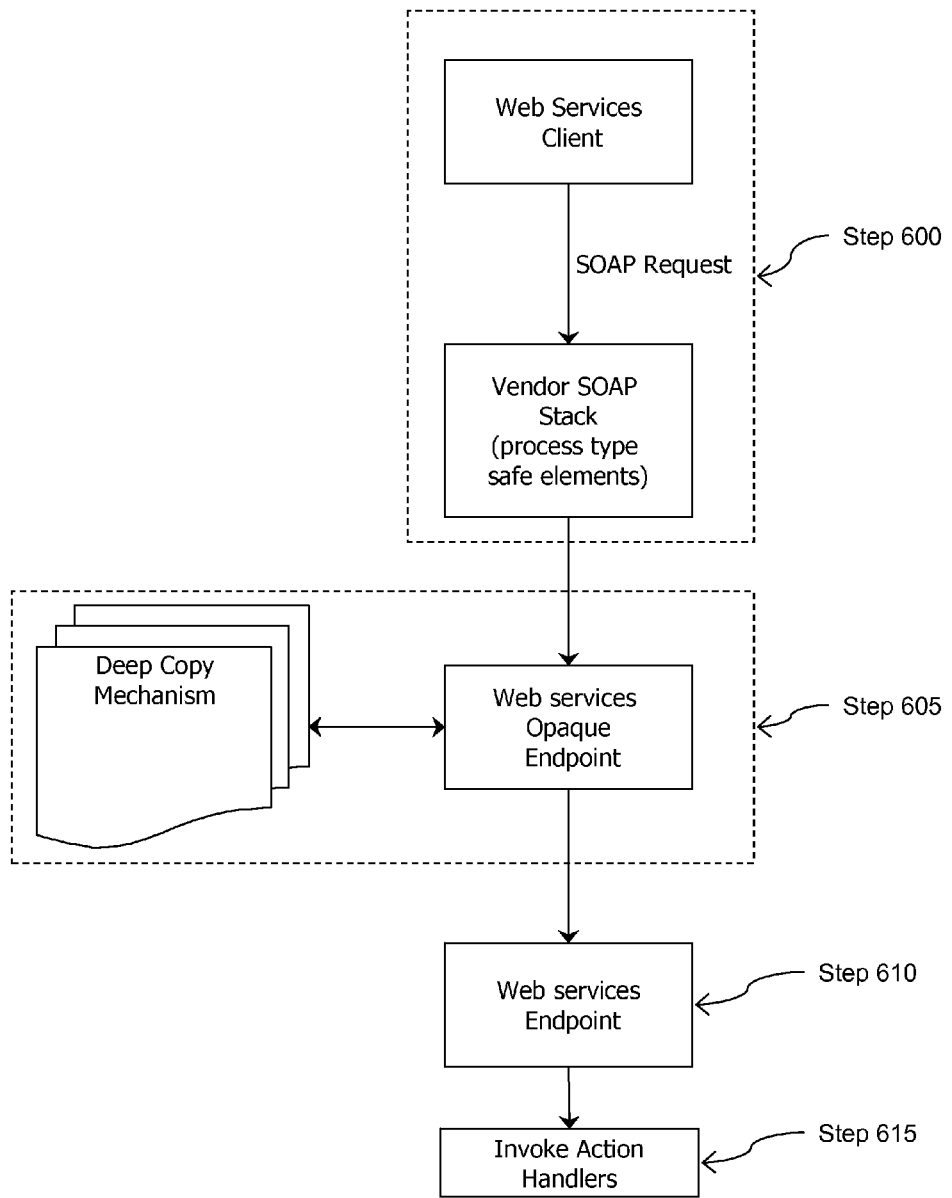
FIG. 6 is a flowchart illustrating a architecture view of the processes disclosed in the presently preferred embodiment.

FIG. 6 is a flowchart illustrating a architecture view of the processes disclosed in the presently preferred embodiment. As show in FIG. 6, and further referenced in FIGS. 3 & 4, during runtime, type-safe data is parsed and mapped to corresponding java objects by the vendor SOAP stack (Step 600). The opaque endpoint is invoked that calls the appropriate deep copy helpers to fill in the data corresponding to the opaque types (Step 605). Once the entire data is copied to java objects, then the web services end point is called (Step 610) to invoke action handlers (Step 615) that handles the copied data for an action defined by the user and/or the system.

CONCLUSION

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment, such as additional protocols for exchanging XML-based messages over a computer network can include GXA, REST, and XML-RPC, for example. Likewise other formats, other than the PML XML schema, for facilitating product lifecycle interoperability using XML are anticipated by the disclosed presently preferred embodiment. Alternatively, the data structure can be serialized in the java objects to XML and apply a style sheet to the XML document, and then marshal the new XML document to the target java object. Therefore, other implementations are within the scope of the following claims.

What is claimed is:

1. A method of parsing a schema across a system to support interoperable machine-to-machine interaction over a network, comprising the steps of:
   communicating a plurality of data in a data defining mark-up language file by a transport protocol stack;
   parsing said data defining mark-up language to determine at least one opaque schema element by a deep copy mechanism comprising the steps of:
      calling a deep copy helper to extract a plurality of opaque data corresponding to input type:
      filling a plurality of objects with said opaque data in a recursive manner; and
      returning said objects to convert to an opaque string; and
   translating said at least one opaque schema element to a mark-up language string element.

2. The method of claim 1, wherein said data defining mark-up language is XML.

3. The method of claim 1, wherein said parsing step is included in a Web Services Definition Language (WSDL) format.

4. The method of claim 1, wherein said translating step uses a XML namespace.

5. The method of claim 4, wherein said XML namespace is an interoperability format.

6. The method of claim 1, wherein said communicating step occurs over a network capable of interoperable machine-to-machine interaction.

7. The method of claim 1, wherein said transport protocol stack is a protocol for exchanging XML-based messages over a computer network.

8. The method of claim 1, wherein said transport protocol stack is SOAP.

9. A computer readable medium for storing executable instructions to perform a method of parsing a schema across a plurality of disparate vendors having interoperability of at least one web service, comprising:
   instructions for communicating a plurality of data in a data defining mark-up language file by a transport protocol stack;
   instructions for parsing said data defining mark-up language to determine at least one opaque schema element by a deep copy mechanism comprising:
      instructions for calling a deep copy helper to extract a plurality of opaque data corresponding to input type;

instructions for filling a plurality of objects with said opaque data in a recursive manner; and instructions for returning said objects to convert to an opaque string; and instructions for translating said at least one opaque schema element to a mark-up language string element.

10. The computer readable medium of claim 9, wherein said data defining mark-up language is XML.

11. The computer readable medium of claim 9, wherein said instructions for parsing is included in a Web Services Definition Language (WSDL) format.

12. The computer readable medium of claim 9, wherein said instructions for translating uses a XML namespace.

13. The computer readable medium of claim 12, wherein said XML namespace is an interoperability format.

14. The computer readable medium of claim 9, wherein said instructions for communicating occurs over a network capable of interoperable machine-to-machine interaction.

15. The computer readable medium of claim 9, wherein said transport protocol stack is a protocol for exchanging XML-based messages over a computer network.

16. The computer readable medium of claim 9, wherein said transport protocol stack is SOAP.

17. A data processing system comprising a processor and accessible memory; the data processing system configured to implement a method for parsing a schema across a system to support interoperable machine-to-machine interaction over a network by performing the steps of:

communicating a plurality of data in a data defining mark-up language file by a transport protocol stack;

parsing said data defining mark-up language to determine at least one opaque schema element by a deep copy mechanism; and translating said at least one opaque schema element to a mark-up language string element.

* * * * *